Nov. 7, 1944.　　　　F. S. EVES　　　　2,362,125
SEAL
Filed April 2, 1943
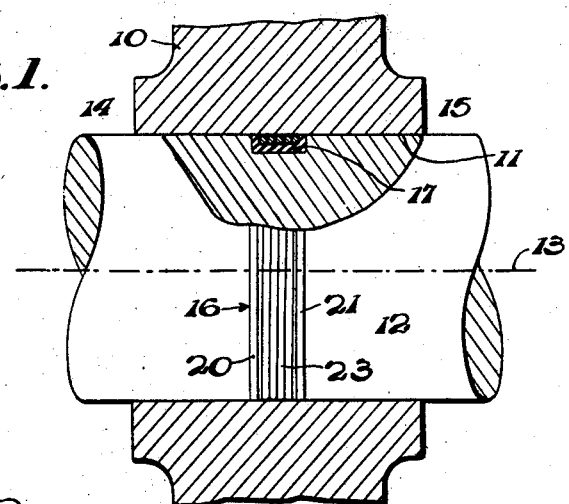
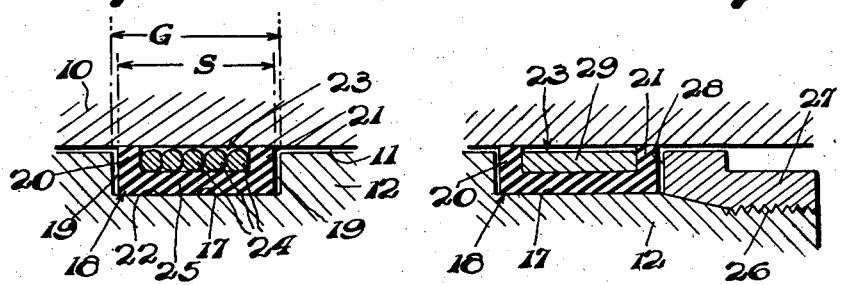
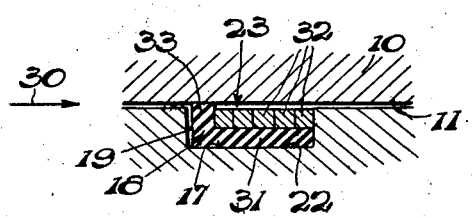
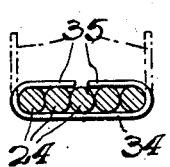
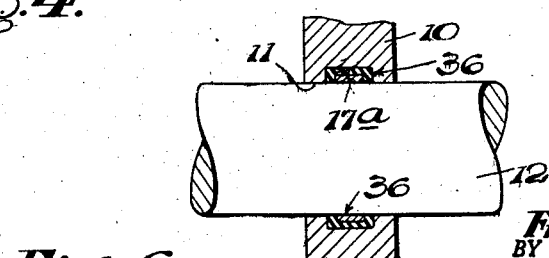
INVENTOR.
Frederick Sydney Eves.
BY
Martin J. Finnegan.
Attorney Patented Nov. 7, 1944

2,362,125

UNITED STATES PATENT OFFICE 2,362,125

SEAL

Frederick Sydney Eves, Leamington Spa, England, assignor to Automotive Products Company Limited, Leamington Spa, England Application April 2, 1943, Serial No. 481,622
In Great Britain January 16, 1942

2 Claims. (Cl. 286—26)

This invention relates to fluid seals for use between relatively rotating members and it has for its primary object to provide a simple yet efficient form of seal. The invention is, of course, of particular utility in connection with shafts and like members adapted to have a rotary or angular movement relative to a housing or equivalent, the packing being operatively interposed between the shaft and the housing in order to prevent leakage of fluid into and/or out of said housing.

In a packing device, for preventing leakage of fluid in an axial direction between a pair of members which move angularly one within the other, comprising an annular sealing member of soft resilient material, such as rubber, the invention is characterised by the fact that retaining means, for clamping the sealing member in a radial direction into firm engagement with the bottom of a circumferential groove formed in one of the relatively movable members, is disposed between said sealing member and the other of the relatively movable members, the retaining means leaving an annular portion of the sealing member free to bear upon the surface of the said other of the relatively movable members.

There is further provided according to the invention a packing device for preventing leakage of fluid in an axial direction between a pair of members arranged to move angularly one within the other, said packing device comprising an annular sealing member which is of substantial U-shape in radial section and which lines a circumferential groove formed in one of the relatively movable members, and retaining means which is disposed within the sealing member and acts to clamp the latter radially into the groove so that the edges of the sealing member rub against the other of the movable members.

The retaining means may comprise a flat strip in the form of a band composed of metal or like material which is relatively rigid as compared with the sealing member, said band conveniently being endless. If desired, the groove which accommodates the sealing member may be formed on the outer surface of the inner of the relatively movable members. The retaining means can comprise a plurality of turns of wire which may be wound in the form of a helix, and the wire can be of substantially rectangular cross-section. The turns of wire constituting the retaining means can be bonded or otherwise held together by one or more binding members.

Preferably the sealing member is slightly narrower than the groove, thereby leaving an annular space within which fluid pressure acts between the side of the groove and the adjacent surface of the sealing member, so that the latter tends to become compressed axially and to spread radially against the two relatively movable members.

In an alternative construction the sealing member is substantially L-shaped in radial section, one limb constituting a tube of short axial length which is clamped against the bottom of the groove by the retaining means, and the other limb forming a substantially radial flange adapted to extend alongside the retaining means so as to bear against the other of said relatively movable members.

The invention is illustrated by way of example in the accompanying diagrammatic drawing, in which:

Figure 1 is an elevation, partly in section, showing an improved packing device for a rotary shaft;

Figure 2 is a fragmentary radial section of the packing corresponding to Figure 1 but drawn to an enlarged scale;

Figures 3 and 4 are also fragmentary radial sections but showing modified forms of construction;

Figure 5 is a radial section of the retaining means, showing one method of securing the turns of wire; and Figure 6 is a sectional elevation showing how the packing device can be applied to a housing or other outer member.

In the general arrangement shown in Figure 1 a housing, casing, partition or other member constituting part of a fluid pressure apparatus is indicated generally at 10 and is formed with a bore 11 through which passes a shaft 12, the latter being arranged to rotate about its axis, which is indicated in broken lines at 13. It is required to prevent leakage of pressure fluid (i. e., gas or liquid, depending upon the apparatus in which the invention is utilised) from the space 14 at one side of the member 10 to the space 15 at the other, or vice versa, and for this purpose the shaft 12 is provided with an annular packing device, which is indicated generally at 16 in Figure 1, said packing device being accommodated within a circumferential groove 17 of relatively shallow rectangular cross-section formed around the shaft 12.

The construction of the packing device will be seen more clearly from Figure 2 and it comprises an annular sealing member 18, which is composed of soft rubber or like readily deformable resilient material, said sealing member being of substantially U-shaped radial section so as to fit snugly within the groove 10 and virtually constitute a lining therefor. The axial length of the sealing member 18 when fitted is preferably slightly less than the corresponding dimension of the groove 17, as shown in Figure 2, these measurements being indicated at S and G respectively. This leaves at one or each side of the sealing member 18 a thin annular space 19. The limbs or side portions 20 and 21 of the sealing member 18 are sufficiently wide in a radial direction to be an interference fit between the bottom 22 of the groove 17 in the shaft 12 and the surface of the bore 11 in the member 10, thus providing a seal to prevent leakage of fluid between the members 10 and 12 in either direction. The efficiency of this seal is improved by the provision of the space or spaces 19, since the fluid under pressure can gain access to this space (or where two such spaces are present, to that space 19 which is nearer to the pressure fluid being sealed), and by acting upon the adjacent radial surface of the limb 20 or 21 compress said limb in an axial direction, thereby causing it to tend to spread radially and as a result to press more firmly upon the surface of the bore 11.

The sealing member 18 is maintained in firm and uniform gripping engagement with the shaft 12 by retaining means, which is indicated generally at 23, and comprises a plurality of turns of stout metal wire wound in the form of a helix so as to fill substantially the space between the limbs 20 and 21 of the sealing member 18. The turns 24 are wound relatively tightly upon the intermediate or base portion 25 of the sealing member 18, or, if desired, the retaining means 23 may be constructed from springy wire so that it contracts resiliently of its own accord so as to force the sealing member 18 into firm contact with the bottom 22 of the groove 17. The provision of the retaining means has a decidedly beneficial effect in keeping the sealing member 18 in shape and may prevent it from becoming jammed locally (and consequently stretched at other parts) due to the relative rotation between the members 10 and 12. The efficiency of the seal is thus preserved when the parts are in motion and its useful life is also increased by the provision of the retaining means 23.

An alternative construction is shown in Figure 3 and this is primarily applicable where the packing device is installed adjacent the end of the shaft 12 or a shoulder formed on said shaft. The end of the shaft 12 is screw-threaded at 26 for the reception of a collar 27, which, when in position, forms a removable side wall 28 of the groove 17. The sealing member 18 is constructed as before but the retaining means 23 is in the form of an endless strip or band 29 composed of metal or like relatively rigid material (by comparison with the material of the sealing member 18). With this arrangement the parts are assembled by fitting the sealing member 18 into the band 29, putting these parts in position upon the shaft 12 and finally screwing the collar 27 into place. The band 29 can be split at one point in its length so that it can be sprung open for assembly purposes and in this case the packing device can be used with the form of groove 17 shown in Figures 1 and 2, the resilience of the band 29 holding the sealing member 18 firmly in position.

Another arrangement shown in Figure 4 is adapted primarily for preventing leakage of pressure fluid in the direction indicated by the arrow 30. In this instance the sealing member 18 is of substantially L-shaped radial section, one limb 31 constituting a tube of short axial length compared with its diameter, said tube being clamped against the bottom 22 of the groove 17 by means of a retaining member 23 comprising a helix of square section wire, the turns of said helix being indicated at 32. The other limb of the L section forms a radial flange 33 which is arranged to bear resiliently against the surface of the bore 11 in the member 10 and against the bottom 22 of the groove 17 so as to form the requisite seal, aided, of course, by the fluid pressure acting in the space 19, as before.

Where the retaining means 23 comprises a number of turns of wire, these may be secured together by sweating, soldering, cementing or the like, or alternatively they may be held together at intervals by thin metal strips, as indicated at 34 in Figure 5, these strips being initially U-shaped and having their ends 35 bent downwards over the wire turns 24 after the latter have been applied around the sealing member 18.

It may be desirable in some cases to fit the packing device internally within a groove 17a formed in the bore 11 of the member 10, as indicated generally at 36 in Figure 6, the shaft 12 in this instance, of course, having a plain cylindrical external surface. The construction of the parts is the same as before except that the limbs 20 and 21 (or 33) are directed inwards so as to engage resiliently with the surface of the shaft 12. As the retaining means 23 has, of course, to press the sealing member 18 outwards instead of inwards, it normally acts under compression and it is therefore desirable that it should have sufficient rigidity to prevent buckling; for this reason it is preferred that the retaining means should take the form of a band, such as 29 in Figure 3, although a wire helix can be used so long as the wire is relatively stout.

It will be appreciated that the constructions which have been described are given merely as examples and that various further modifications may be made in the form and design of the sealing ring so as to suit requirements.

What I claim is:

1. A packing device for preventing leakage of fluid in an axial direction between a pair of members which move angularly one within the other, said packing device comprising an annular sealing member of soft resilient material such as rubber and having a portion lying in the base of a circumferential groove formed in one of the relatively movable members which portion is spaced from the surface of the other of the relatively movable members, and at least one annular portion free to bear on the surface of said other member, and retaining means for clamping the sealing member in a radial direction into firm engagement with the bottom of the circumferential groove, said retaining means lying within the confines of the circumferential groove and substantially filling the space between the first-mentioned portion of the sealing member and the other of the relatively rotatable members, whereby the annular portion of the sealing member is supported on both sides substantially up to the bearing surface of the latter.

2. In a seal construction, the combination with a pair of nested relatively movable elements with one of said elements being provided with a groove defined by spaced confronting faces and an intermediate face opposing the other element; of a resilient member disposed in said groove and having opposite faces with one of the opposite faces lying flat against said intermediate face and the other opposite face disposed in spaced relation with said other element, said member being formed with at least one side wall spaced from the adjacent confronting face to provide a channel for receiving fluid under sufficient pressure for compressing said side wall and effect extension thereof towards and into sealing engagement with said other element, and retaining means disposed wholly within the confines of said groove and in engaging relation with said second opposite defined face of said resilient member for maintaining its first defined opposite face lying flat against said intermediate face and for coacting with said fluid for effecting said extension.

FREDERICK SYDNEY EVES.